United States Patent [19]

De Koning

[11] Patent Number: 5,345,083
[45] Date of Patent: Sep. 6, 1994

[54] X-RAY DETECTOR COMPRISING AN IMPROVED ENTRANCE WINDOW

[75] Inventor: Johannes J. De Koning, Almelo, Netherlands

[73] Assignee: U.S. Philips Corporation, New York, N.Y.

[21] Appl. No.: 20,500

[22] Filed: Feb. 22, 1993

[30] Foreign Application Priority Data

Feb. 21, 1992 [EP] European Pat. Off. ........ 92200505.3

[51] Int. Cl.⁵ .............................................. G01T 1/185
[52] U.S. Cl. ...................................... 250/379; 250/374
[58] Field of Search ............. 378/161; 250/374, 385.1, 250/379

[56] References Cited

U.S. PATENT DOCUMENTS

| | | | |
|---|---|---|---|
| 2,663,812 | 12/1953 | Jamison et al. | 378/161 |
| 3,835,341 | 9/1974 | Zingaro | 378/161 |
| 4,633,089 | 12/1986 | Wijangco | 250/374 |
| 4,933,557 | 6/1990 | Perkins et al. | 378/161 |
| 5,159,621 | 10/1992 | Watanabe et al. | 378/161 |

FOREIGN PATENT DOCUMENTS 0283061  2/1988  European Pat. Off.

Primary Examiner—Carolyn E. Fields
Attorney, Agent, or Firm—Jack D. Slobod

[57] ABSTRACT

An inner side of a radiation entrance window in an X-ray detector is provided with an electrically conductive layer of gold, platinum, irridium or a mixture of these elements. Using such a layer, suitable electrical conductivity, a low radiation absorption for soft X-rays and a suitable mechanical stability can be achieved also in the case of a comparatively small layer thickness.

15 Claims, 1 Drawing Sheet

X-RAY DETECTOR COMPRISING AN IMPROVED ENTRANCE WINDOW

BACKGROUND OF THE INVENTION

1. Field of the Invention

The invention relates to an X-ray detector, comprising a gas-filled ionization space which is closed by a radiation entrance window which is covered with an electrically conductive material. The invention also relates to an X-ray analysis apparatus comprising such a detector.

2. Description of the Related Art

In known X-ray detectors of this type, notably on the inner side of the radiation entrance window there is provided an electrically conductive layer for draining electric charges during measurement. Such a layer notably consists of aluminum, because this material can be comparatively easily provided by vapor deposition, has a comparatively high electrical conductivity and notably also because aluminum, having a low atomic number, combines low density with a mass absorption value such that it has a comparatively low specific absorption also for soft X-rays.

During analysis of elements having a low atomic number, such as borium and beryllium, however, the absorption of the aluminum layer is still found to be disturbing. This is due notably to the fact that the aluminum layer cannot be very thin because of the required adequate electrical conductivity and stability.

SUMMARY OF INVENTION

It is an object of the invention to mitigate this drawback; to achieve this, an X-ray detector of the kind set forth in accordance with the invention is characterized in that the electrically conductive material is deposited in the form of a layer of material from the group Ir (77), Pt (78) and Au (79) or a mixture thereof.

Inter alia because of the attractive electrical properties of said materials, while maintaining adequate electric conductivity, to prevent disturbing charging phenomena, a substantially smaller thickness in comparison with that of the aluminum layer suffices. In comparison with the known layer, a layer having a substantially lower radiation absorption can thus be obtained. Because the layer is thinner, it will also be less susceptible to mechanical destruction due to expansion and shrinkage of the window under the influence of temperature variations and the like. The higher density of said materials is compensated for by the lower mass absorption for soft X-rays as characteristic of, for example borium and beryllium. For example, gold has a density which is approximately a factor 7 higher than that of aluminum, so that gold appeared to be extremely unattractive; however, this is compensated for by a mass absorption coefficient of gold which is approximately 6 times lower than that of aluminum for the relevant X-rays.

The electrically conductive layer in a preferred embodiment consists of a layer of gold having a thickness of, for example at the most approximately 40 nm. In practical cases a thickness of, for example at the most approximately 10 nm suffices. All requirements (coefficient of expansion) can be readily satisfied by means of such a layer. Gold being a noble metal, which is suitably inert to external influences, a disturbing effect of the conductive layer on the operation of the detector is also avoided. A gold layer can be provided, for example by vapor deposition, so as to be suitably bonded to a relevant carrier such as a plastic layer or a beryllium layer.

Particularly attractive combinations are, for example polypropylene or Mylar (polyethylene terephthalate or terephthalate, also known as PET) windows with a vapor-deposited gold layer. In radiation detectors for analysis in the long wavelength range, i.e. for elements having a low atomic number such as borium or beryllium, a window exhibiting an extremely low absorption is thus realised.

In a preferred embodiment, the detector in accordance with the invention forms part of an X-ray analysis apparatus, notably for the analysis of elements having an atomic number lower than, for example 6.

BRIEF DESCRIPTION OF THE DRAWING

Some preferred embodiments in accordance with the invention will be described in detail hereinafter with reference to the drawing. Therein.

DETAILED DESCRIPTION OF THE PREFERRED EMBODIMENT

Figure 1:
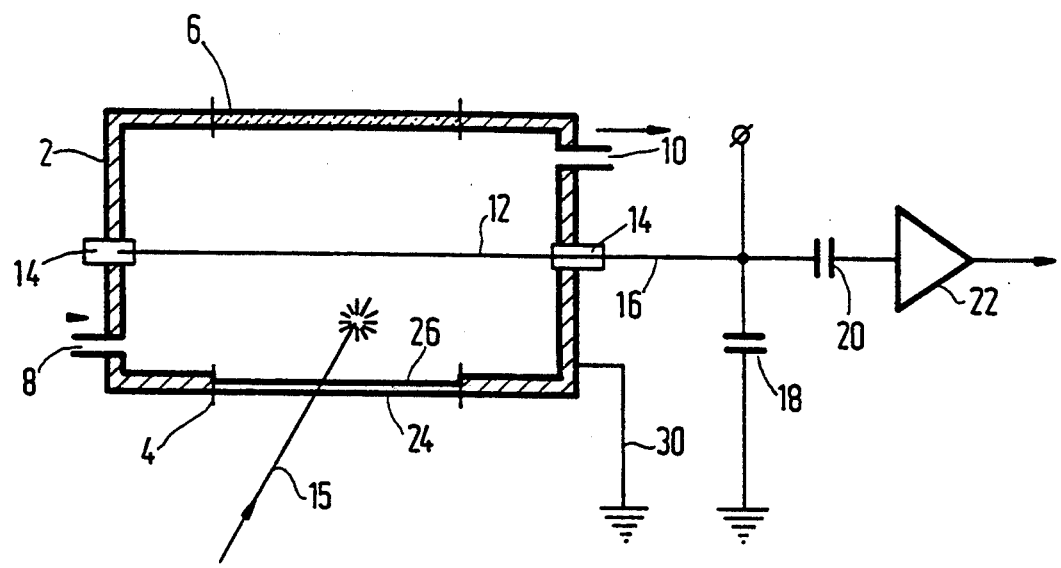
FIG. 1 shows an X-ray detector in accordance with the invention.

FIG. 1 shows a gas flow ionization counter comprising a housing 2 with an entrance window 4, an exit window 6, a gas inlet duct 8 and a gas outlet duct 10. In the counter an anode wire 12 is arranged so as to be electrically insulated, via insulators 14, from a preferably metal housing 2. A part of the incident X-rays 15 causes ionization of the gas contained in the counter, for example argon, and electrons thus released are captured by the anode wire of increased potential. Charge pulses caused by the captured electrons are applied, via an output lead 16 grounded via a capacitor 18, to a preamplifier 22, via a capacitor 20, after which they are further processed. It is also possible to detect the ions formed by means of a negative anode voltage, but electrons are to be preferred because of their shorter transit time. The entrance window 4, consisting of, for example a polypropylene film 24, is provided with an electrically conductive layer 26 on an inner side, for example in this case a gold layer. The extremely thin gold layer is in electrical contact with the housing 2 so that charge carriers incident thereon can be drained via a ground lead 30. Part of the incident radiation, notably hard radiation, leaves the detector via the exit window 6 and can be detected, for example in a subsequent counter which is more suitable for hard radiation. The exit window is preferably also provided with an electrically conductive layer, but because notably hard radiation is concerned, its thickness and material are less critical.

Figure 2:
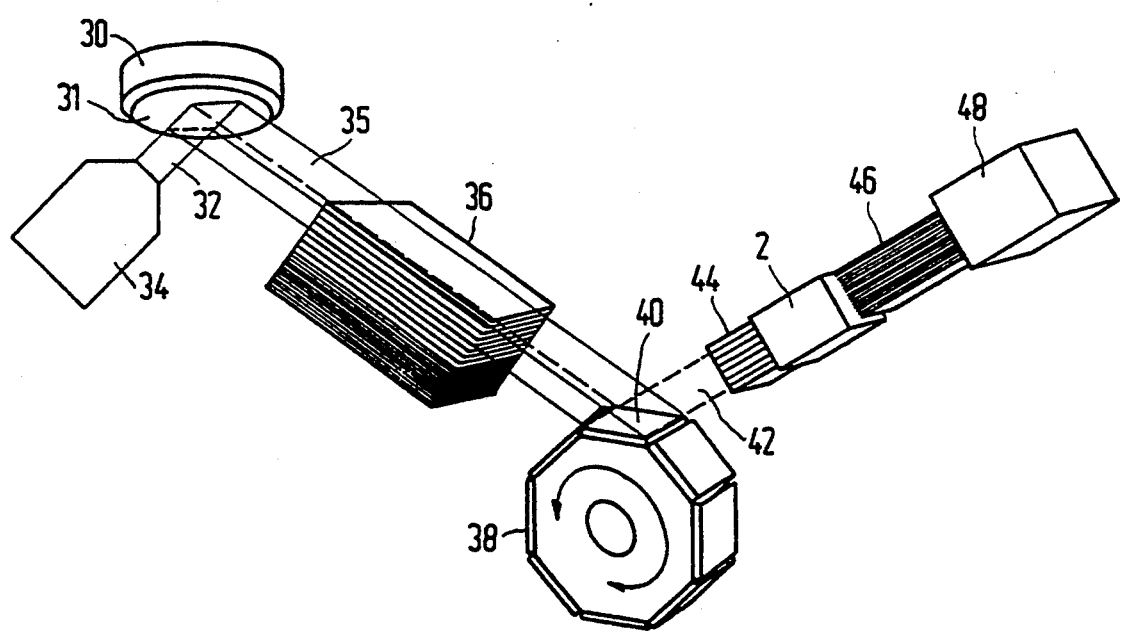
FIG. 2 shows an X-ray analysis apparatus comprising such a detector.

FIG. 2 shows an X-ray analysis apparatus in the form of a sequential spectrometer, comprising a detector 2 as shown in FIG. 1. Therein, a surface 31 of a specimen 30 is irradiated by an X-ray beam 32 generated in an X-ray tube 34. An X-ray beam 35 emanating from the specimen is incident, after passing a collimator 36, on an analysis crystal 40 mounted on a crystal holder 38. A beam 42 reflected thereby enters the detector 2, after passing a collimator 44, and is partly detected therein by gas ionization. A non-detected part of the X-ray beam is detected in, for example a scintillation counter 48 after passing a subsequent collimator 46.

I claim:

1. An X-ray detector for analysis of elements having an atomic number lower than 6, comprising a gas-filled ionization chamber which is closed by a radiation entrance window having an electrically conductive material deposited on an inner side of the window in the form of a layer, which material is selected from the group consisting of Ir(77), Pt(78), and Au(79), or a mixture thereof.

2. An X-ray detector as claimed in claim 1, wherein the electrically conductive material is gold, said layer having a thickness of at the most approximately 10 nm.

3. An X-ray detector as claimed in claim 2, wherein the ionization chamber comprises a gas flow chamber.

4. An X-ray detector as claimed in claim 3, wherein the entrance window comprises a plastic film.

5. An X-ray detector as claimed in claim 4, wherein said plastic film is polypropylene.

6. An X-ray detector as claimed in claim 2, wherein the entrance window comprises a plastic film.

7. An X-ray detector as claimed in claim 6, wherein said plastic film is polypropylene.

8. An X-ray detector as claimed in claim 2, wherein the entrance window comprises polyethylene terephthalate.

9. An X-ray detector as claimed in claim 1, wherein the ionization chamber comprises a gas flow chamber.

10. An X-ray detector as claimed in claim 1, wherein the entrance window comprises a plastic film.

11. An X-ray detector as claimed in claim 10, wherein the entrance window comprises polypropylene.

12. An X-ray detector as claimed in claim 1, wherein the entrance window comprises polyethylene terephthalate.

13. An X-ray detector as claimed in claim 1, wherein the entrance window comprises beryllium.

14. An X-ray apparatus for analysis of elements having an atomic number lower than 12, comprising an X-ray source and an X-ray detector positioned to receive X-ray radiation from said source via an object under examination, said X-ray detector comprising a gas-filled ionization chamber which is closed by a radiation entrance window having an electrically conductive material deposited on an inner side of the window in the form of a layer, which material is selected from the group consisting of Ir(77), Pt(78), and Au(79), or a mixture thereof.

15. An X-ray apparatus as claimed in claim 14, wherein the electrically conductive material is gold, said layer having a thickness of at the most approximately 10 nm.

* * * * *